(12) United States Patent
Kruse (10) Patent No.: US 10,222,630 B2
(45) Date of Patent: Mar. 5, 2019

(54) ONE-PIECE EYEWEAR ARTICLE

(71) Applicant: Torsten Kruse, Naples, FL (US)

(72) Inventor: Torsten Kruse, Naples, FL (US)

(*) Notice: Subject to any disclaimer, the term of this patent is extended or adjusted under 35 U.S.C. 154(b) by 0 days.

(21) Appl. No.: 15/798,328

(22) Filed: Oct. 30, 2017

(65) Prior Publication Data

US 2018/0335642 A1 Nov. 22, 2018

Related U.S. Application Data

(60) Provisional application No. 62/509,017, filed on May 19, 2017.

(51) Int. Cl.
| | | |
|---|---|---|
| *G02C 1/00* | (2006.01) | |
| *G02C 5/00* | (2006.01) | |
| *G02B 1/04* | (2006.01) | |
| *G02C 5/22* | (2006.01) | |
| *G02C 5/02* | (2006.01) | |
| *B29D 12/02* | (2006.01) | |
| *B29D 11/00* | (2006.01) | |
| *G02C 7/10* | (2006.01) | |
| *B29K 83/00* | (2006.01) | |

(52) U.S. Cl.
CPC ........ *G02C 5/008* (2013.01); *B29D 11/00432* (2013.01); *B29D 12/02* (2013.01); *G02B 1/041* (2013.01); *G02C 1/10* (2013.01); *G02C 5/02* (2013.01); *G02C 5/22* (2013.01); *G02C 7/108* (2013.01); *B29K 2083/005* (2013.01); *B29K 2995/0018* (2013.01); *G02C 2200/16* (2013.01)

(58) Field of Classification Search
CPC ........ C09D 7/12; G02C 2200/10; G02C 5/22; G02C 5/008; A61F 2/16; B05B 12/14
USPC ......... 351/41, 153; 521/55; 134/26; 424/427
See application file for complete search history.

(56) References Cited

U.S. PATENT DOCUMENTS

| | | | | |
|---|---|---|---|---|
| 4,400,067 A | * | 8/1983 | Joffe | .......... G02C 9/02 351/59 |
| 2010/0210745 A1 | * | 8/2010 | McDaniel | .............. C09D 5/008 521/55 |

* cited by examiner

*Primary Examiner* — Hung Dang
(74) *Attorney, Agent, or Firm* — Mark Terry (57) ABSTRACT

A one-piece, composite eyewear article including a frame having two temples, two eye wires, a bridge and two hinges, the entire frame composed of a single integral piece of cured liquid silicone rubber consisting of a liquid dimethyl polysiloxane polymer thermoset, a lens situated within the two eye wires and extending across the bridge, the lens composed of a single integral piece of optical grade cured liquid silicone rubber consisting of a liquid dimethyl polysiloxane polymer thermoset, and wherein the frame and lens are molded via a two-material molding process, such that the frame auto-adheres to the lens during curing.

19 Claims, 10 Drawing Sheets

ONE-PIECE EYEWEAR ARTICLE

CROSS-REFERENCE TO RELATED APPLICATIONS

This application claims priority to provisional application 62/509,017 filed May 19, 2017 and titled One Piece Eyewear Article. The subject matter of provisional application 62/509,017 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to the field of eyewear and, more specifically, relates to eyewear manufactured using novel processes and materials.

BACKGROUND

Eyewear consists of items and accessories worn on or over the eyes, for fashion or adornment, protection against the environment, and to improve or enhance visual acuity. Common forms of eyewear include glasses (also called eyeglasses or spectacles), sunglasses, and the like. Eyewear can also include more utilitarian forms of eye protection, such as goggles. A standard eyewear article comprises two lenses and a frame, which includes two temples, two eye wires, the bridge and two hinges. The temples are the arms that are placed over a wearer's ears and the eye wires are the portion of the frame that hold the two lenses in place. The bridge connects the two eye wires together, and the hinges rotationally attach the eye wires to the temples.

One of the drawbacks associated with the conventional process for manufacturing eyewear is the large amount of manpower, tooling and fabrication involved. The conventional process for manufacturing eyewear typically involves the following. The temples are manufactured, often using an injection molding process or a metal stamping process. The eye wires and bridge are separately manufactured, also using an injection molding process or a metal stamping process. Then, the hinges are attached to the eye wires and temples, often using manpower, machining or some combination of the two. Lastly, the two lenses are attached to the eye wires, also often using manpower, machining or some combination of the two. Thus, there is a significant number and variation of steps involved in the conventional process for manufacturing eyewear. This can be costly, time consuming and tedious for manufacturers of eyewear.

Furthermore, conventional eyewear suffers certain drawbacks related to its constitution and its usage. Conventional eyewear is often made of standard, smooth plastic which has a tendency of slipping off a user's nose, especially when the user is sweating or has natural oils on his face. Also, conventional eyewear is known to scratch and break easily, as it is typically made of plastic and glass. Further, conventional eyewear is not known to be highly resistant to heat or cold, which limits its usability among individuals who require eyewear in their occupations, such as welders.

Therefore, a need exists to overcome the problems with the prior art as discussed above, and particularly for improved eyewear and a more efficient way of manufacturing said improved eyewear.

SUMMARY

A one-piece, composite eyewear article is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, an article is provided that solves the above-described problems. A one-piece, composite eyewear article includes an eyewear frame comprising of two temples, two eye wires, a bridge and two hinges, the entire frame composed of a single integral piece of cured liquid silicone rubber consisting of a liquid dimethyl polysiloxane polymer thermoset, a lens situated within the two eye wires and extending across the bridge, the lens composed of a single integral piece of optical grade cured liquid silicone rubber consisting of a liquid dimethyl polysiloxane polymer thermoset, and wherein the frame and lens are molded via a two-material molding process, such that the frame auto-adheres to the lens during curing.

In another embodiment, a one-piece, composite eyewear article includes an eyewear frame comprising of two temples, two eye wires, a bridge and two hinges, the entire frame composed of a single integral piece of cured liquid silicone rubber consisting of a liquid dimethyl polysiloxane polymer thermoset, two lenses, each lens situated within one of the two eye wires and each lens composed of optical grade cured liquid silicone rubber consisting of a liquid dimethyl polysiloxane polymer thermoset, and wherein the frame and lens are molded via a two-material molding process, such that the frame auto-adheres to the lens during curing.

In another embodiment, a one-piece, composite eyewear article is prepared by a process comprising the steps of: providing a mold having a first void defining an eyewear frame comprising of two temples, two eye wires, a bridge and two hinges, and a second void defining a lens situated within the two eye wires and extending across the bridge, injecting the first void in the mold with liquid silicone rubber consisting of a liquid dimethyl polysiloxane polymer thermoset, so as to produce said frame as a single integral piece, injecting the second void in the mold with optical grade liquid silicone rubber consisting of a liquid dimethyl polysiloxane polymer thermoset, so as to produce said lens as a single integral piece, allowing a predefined period of time to pass, wherein during said period of time, the frame auto-adheres to the lens during curing, and removing the one-piece, composite eyewear article from the mold.

BRIEF DESCRIPTION OF THE DRAWINGS

The accompanying drawings, which are incorporated in and constitute a part of this disclosure, illustrate various example embodiments. In the drawings.

DETAILED DESCRIPTION

The following detailed description refers to the accompanying drawings. While embodiments of the claimed subject matter may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a one-piece, composite eyewear article that is manufactured using a reduced number of passes in the manufacturing process. The claimed subject matter presents an inexpensively manufactured article that provide high quality eye protection, resists impact and can be immersed in water. The claimed subject matter accomplishes the objectives of conventional eyewear while also reducing manufacturing costs and providing utility to the consumer. Additionally, the material of the claimed subject matter reduces slipping of the eyewear off a user's nose, especially when the user is sweating or has natural oils on his face, and reduces or eliminates scratching and breaking of the frame and lens(es). Further, the material of the claimed subject matter is highly resistant to heat and cold, which increases usability among individuals who require eyewear in their occupations, such as welders and athletes.

Eyewear or eyeglasses are worn on or over the eyes, for fashion or adornment, protection against the environment, and to improve or enhance visual acuity. Eyewear consists of lenses mounted in a frame that holds them in front of a person's eyes, using a bridge over the nose and temples or arms which rest over the ears. Eyewear is typically used for vision correction, such as with reading glasses and glasses used for nearsightedness, for safety in providing eye protection against flying debris or radiation, for glare or bright daylight, for high levels of ultraviolet light, for viewing specific visual information (such as stereoscopy) or three-dimensional movies, or simply for aesthetic or fashion purposes.

Many eyewear articles include one or more of the following known elements: two eye wires or rims surrounding and holding the lenses in place, a bridge which connects the two eye wires, a top bar or brow bar (a bar just above the bridge providing structural support and/or style enhancement), brows or caps (plastic or metal caps which fit over the top of the eye wire for style enhancement and to provide additional support for the lenses), two nose pads that allow a comfortable resting of the eye wires on the nose, two pad arms which connect the eye wire to the nose pads, two end pieces which connect the eye wire via the hinges to the temples, two hinges connecting the end pieces to the temples and allowing a swivel movement, two temples (or earpieces) on either side of the skull, and two temple tips at the end of each temple.

Figure 1:
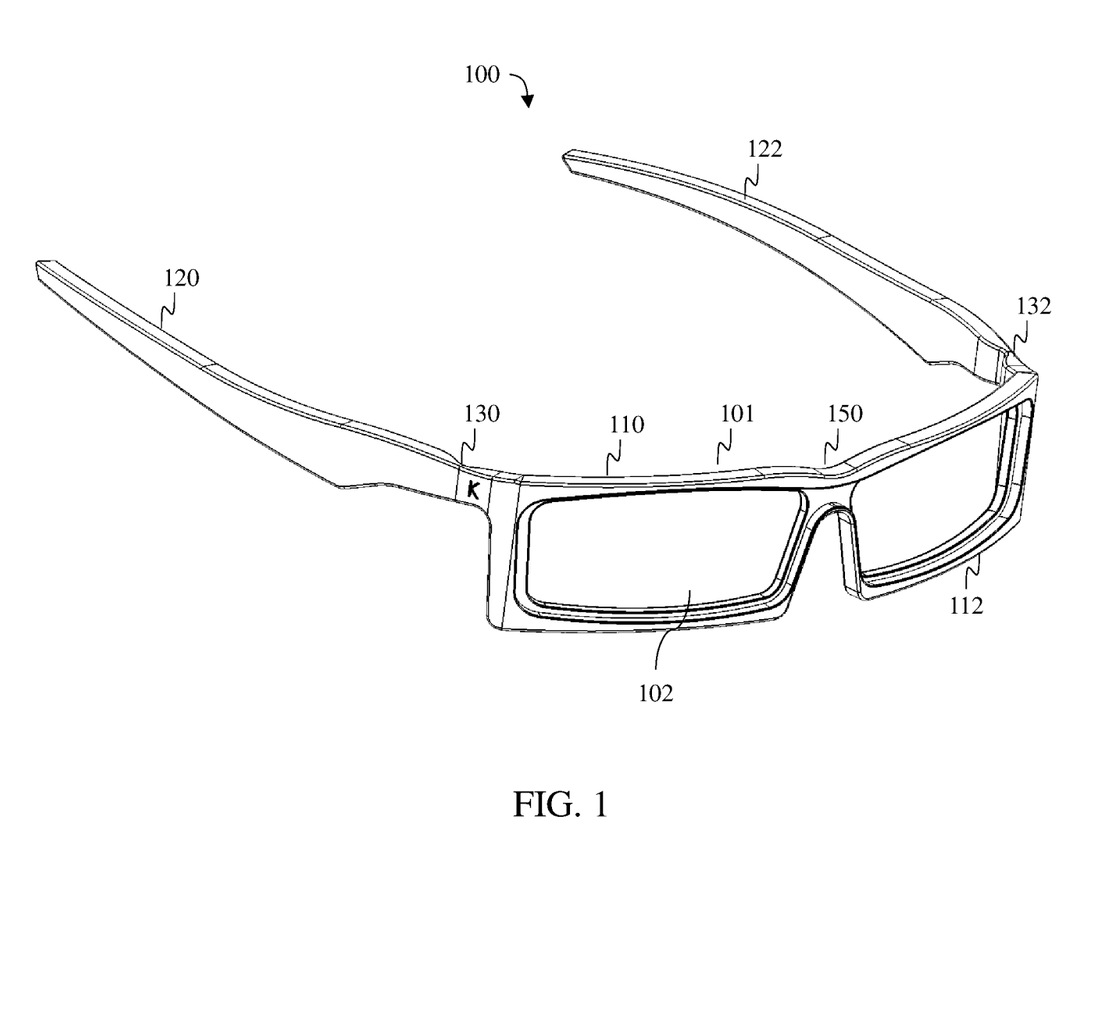
FIG. 1 depicts a front perspective view of a one-piece, composite eyewear article, according to an example embodiment.

FIG. 1 depicts a front perspective view of a one-piece, composite eyewear article 100, according to an example embodiment. FIG. 1 shows that the one-piece, composite eyewear article 100 includes a frame 101 comprising of temples 120, 122, eye wires 110, 112, bridge 150 and hinges 130, 132, the frame 101 composed of cured liquid silicone rubber consisting of a liquid dimethyl polysiloxane polymer thermoset. Liquid silicone rubber is a high purity platinum cured silicone with low compression set, high stability and ability to resist extreme temperatures of heat and cold, ideally suitable for production of parts, where high quality is desired. Liquid silicone rubber is also resistant to breaking, cracking and scratching. Liquid silicone rubber also reduces slippage when placed against human skin, even when the skin is wet or oily.

FIG. 1 shows that the one-piece, composite eyewear article 100 includes a lens 102 located within the eye wires 110, 112, the lens composed of optical grade cured liquid silicone rubber consisting of a liquid dimethyl polysiloxane polymer thermoset. Optical-grade silicones offer high temperature resistance along with optical clarity. Optical liquid silicone rubber does not discolor or lose transparency with age or with exposure to heat or UV light; it is significantly lighter than glass and most other plastics; and it is scratch and crack resistant, among many other advantages.

FIG. 1 shows that the right temple 120 is attached via right hinge 130 to the right eye wire 110, and the right eye wire is connected via bridge 150 to the left eye wire 112, which is further connected via left hinge 132 to the left temple 122. Each temple may bend down behind the ears, follow the contour of the skull and rest evenly against the skull. Each eye wire is shown to be a roughly rectangular shaped frame or rim into which a lens or lens portion is inserted.

Figure 2:
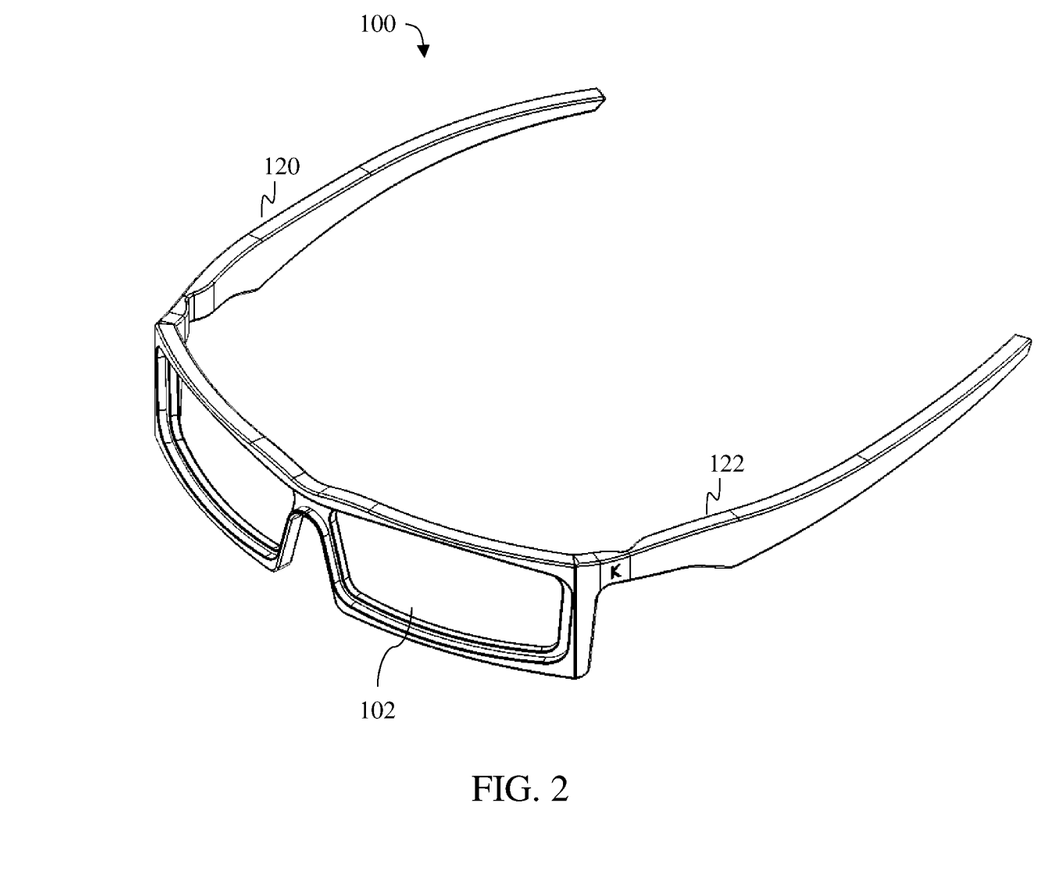
FIG. 2 depicts a top perspective view of the one-piece, composite eyewear article, according to an example embodiment.

FIG. 2 depicts a top perspective view of the one-piece, composite eyewear article 100, according to an example embodiment. FIG. 2 shows a better view of the contours of the left temple 122 and the top side of the left eye wire 112.

Figure 3:
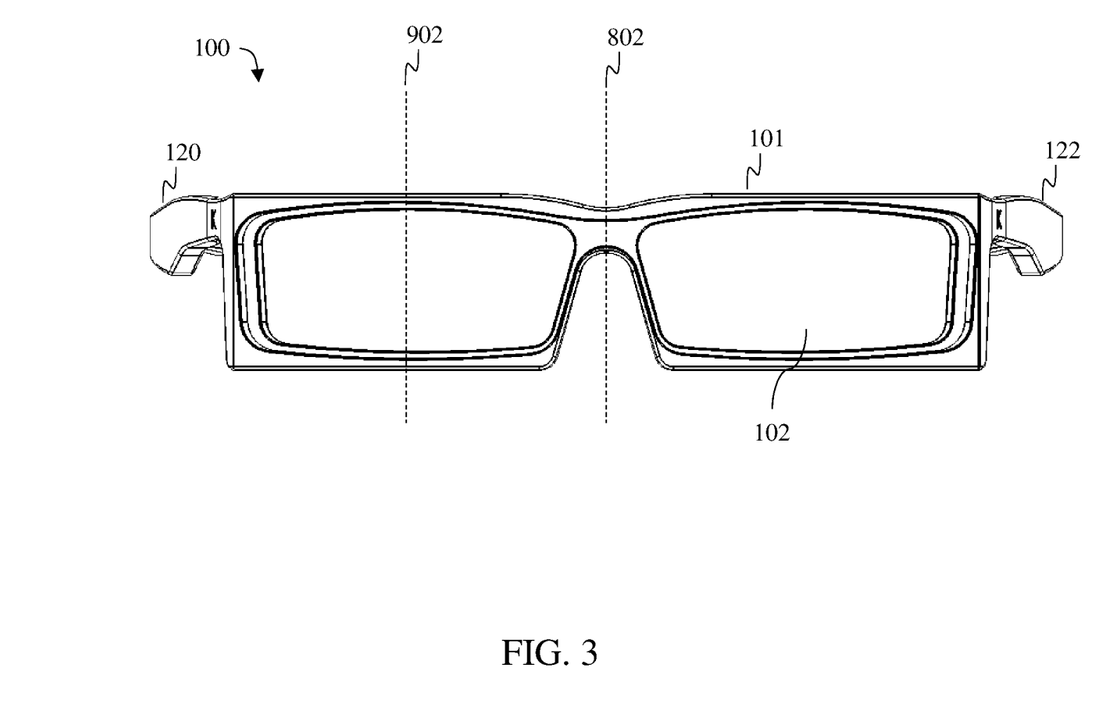
FIG. 3 depicts a front view of the one-piece, composite eyewear article, according to an example embodiment.

FIG. 3 depicts a front view of the one-piece, composite eyewear article 100, according to an example embodiment. FIG. 3 shows the location of the vertical cross section 802 taken on a plane perpendicular to the view of FIG. 3 and through the bridge 150. FIG. 3 also shows the location of the vertical cross section 902 taken on a plane perpendicular to the view of FIG. 3 and through the right eye wire 110.

Figure 4:
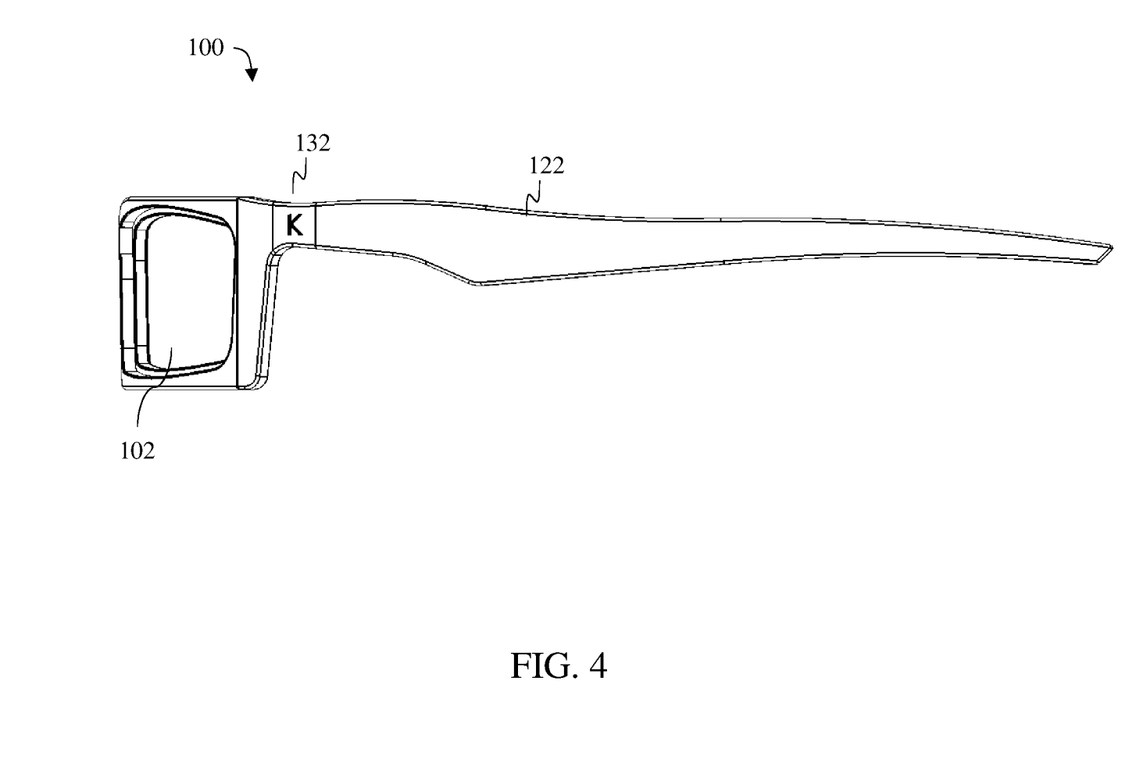
FIG. 4 depicts a left side view of the one-piece, composite eyewear article, according to an example embodiment.

FIG. 4 depicts a left side view of the one-piece, composite eyewear article 100, according to an example embodiment. FIG. 4 shows a better view of the contours of the left temple 122 and the curved nature of the left eye wire 112.

Figure 5:
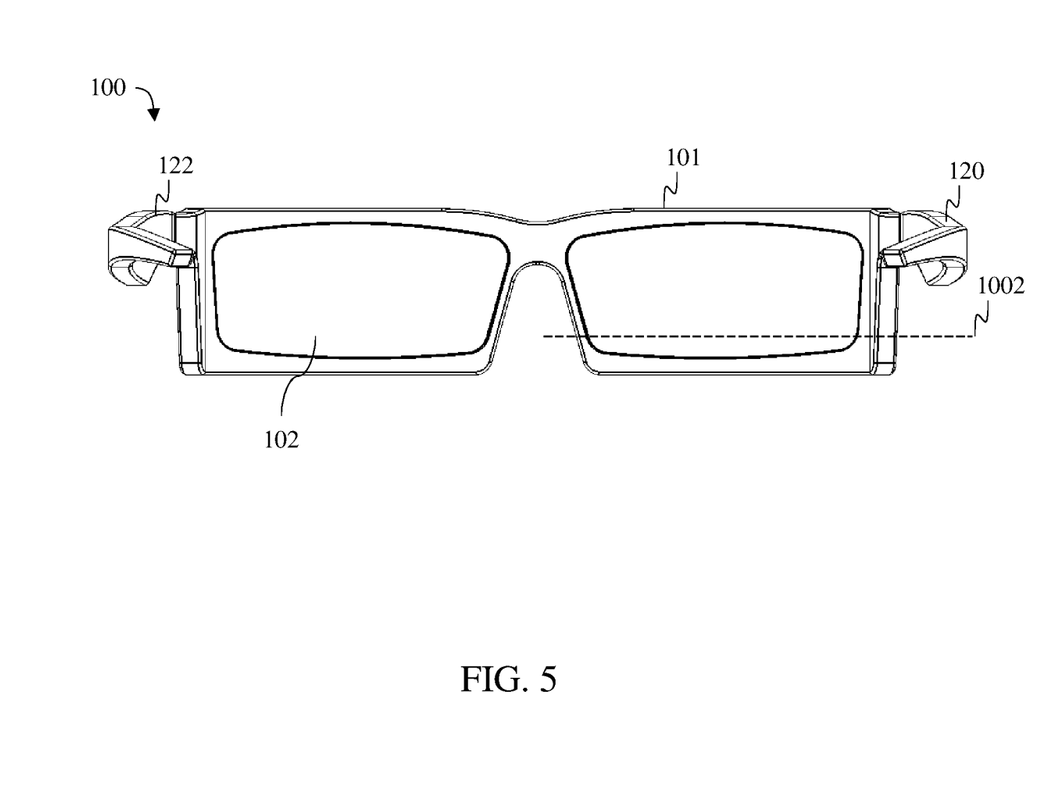
FIG. 5 depicts a rear view of the one-piece, composite eyewear article, according to an example embodiment.

FIG. 5 depicts a rear view of the one-piece, composite eyewear article 100, according to an example embodiment. FIG. 5 shows the location of the horizontal cross section 1002 taken on a plane perpendicular to the view of FIG. 5 and through the right eye wire 110.

Figure 6:
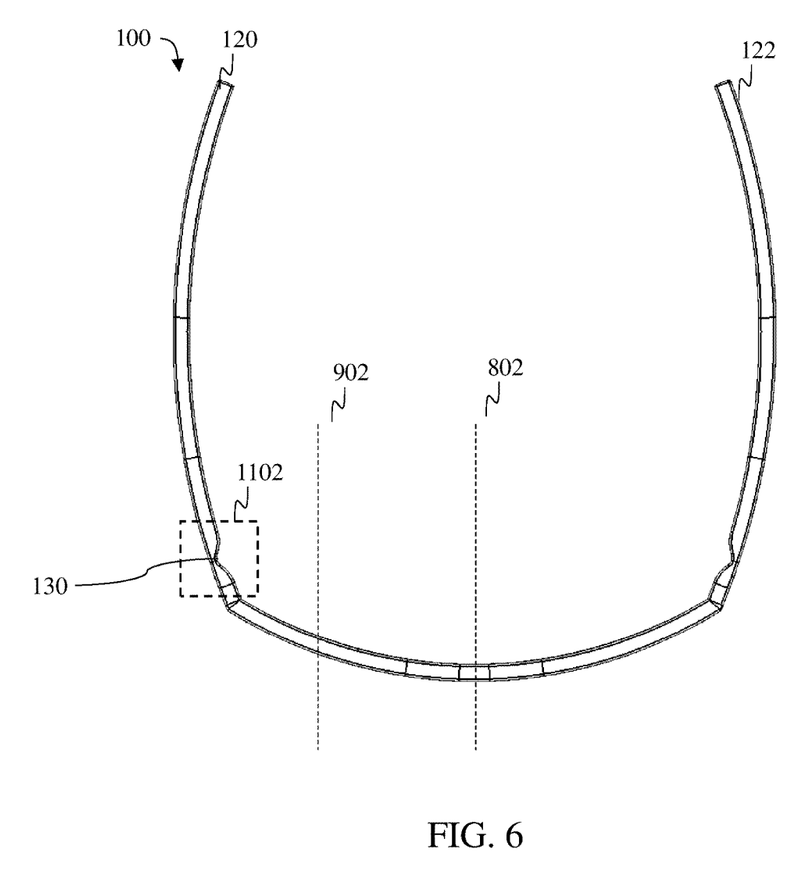
FIG. 6 depicts a top view of the one-piece, composite eyewear article, according to an example embodiment.
Figure 7:
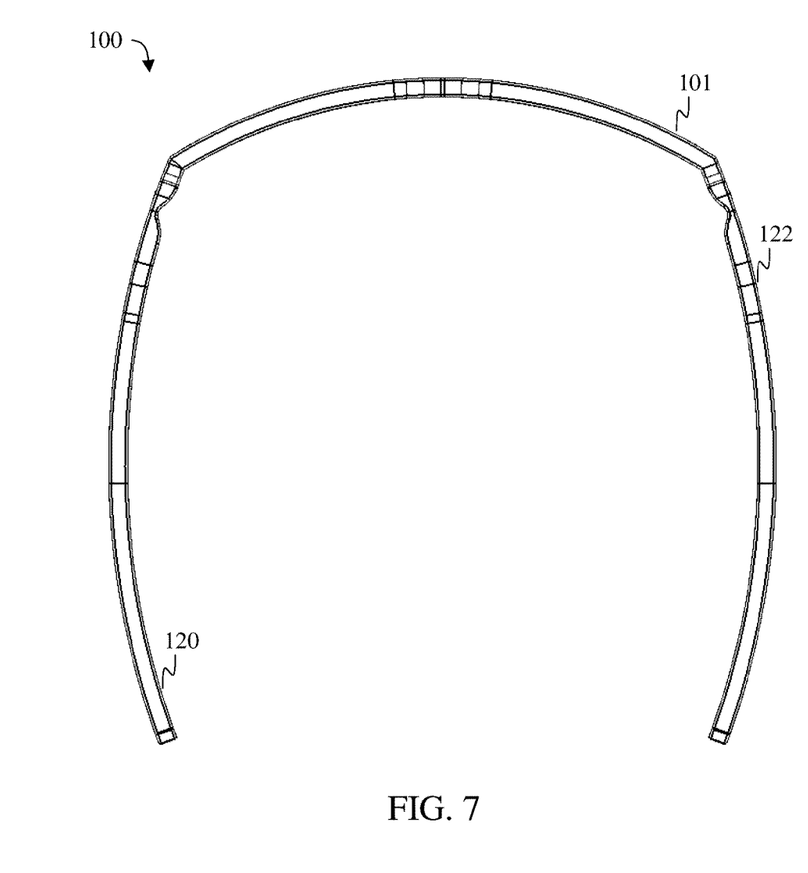
FIG. 7 depicts a bottom view of the one-piece, composite eyewear article, according to an example embodiment.

FIG. 6 depicts a top view of the one-piece, composite eyewear article 100, according to an example embodiment. FIG. 6 shows the location of the vertical cross section 802 taken on a plane perpendicular to the view of FIG. 6 and through the bridge 150. FIG. 6 also shows the location of the vertical cross section 902 taken on a plane perpendicular to the view of FIG. 6 and through the right eye wire 110. FIG. 6 further shows the close-up 1102 taken of the left hinge 130. FIG. 7 depicts a bottom view of the one-piece, composite eyewear article, according to an example embodiment.

Figure 8:
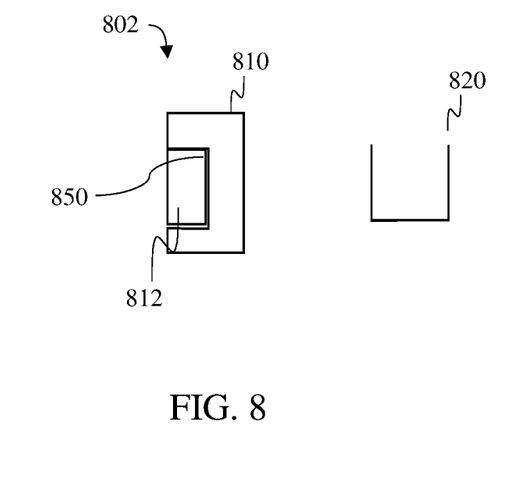
FIG. 8 depicts a cross sectional view of the bridge of the one-piece, composite eyewear article, according to an example embodiment.

FIG. 8 depicts a cross sectional view 802 of the bridge 150 of the one-piece, composite eyewear article 100, according to an example embodiment. FIG. 8 shows that the cross section 802 depicts an approximate U-shaped element 810 representing the bridge 150, which includes a groove, gutter or canal 850, into which the lens 102 is located. The U-shape is depicted in shape 820. A cross section of the lens 102 is shown as an approximate rectangular shape 812.

Figure 9:
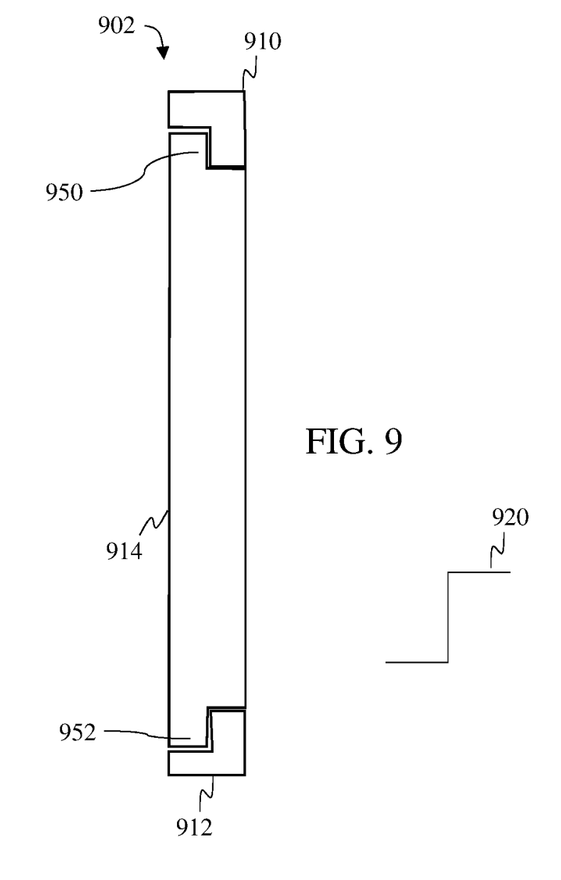
FIG. 9 depicts a cross sectional view of an eye wire and lens of the one-piece, composite eyewear article, according to an example embodiment.

FIG. 9 depicts a cross sectional view 902 of eye wire 110 and lens 102 of the one-piece, composite eyewear article 100, according to an example embodiment. FIG. 9 shows that the cross section 902 of the eye wire 110 is shown as two approximate L-shaped elements 910 and 912, wherein 910 is the top of eye wire 110 and 912 is the bottom of eye wire 110. Cross section 902 depicts an approximate step shaped element 950 representing the interior surface of the eye wire 110 at the top and bottom elements 910 and 912, into which the lens 102 is located. The step shape is depicted in shape 920, and comprises a vertical line connected at a top end to a first horizontal line that extends to the right, and the vertical line connected at a bottom end to a second horizontal line that extends to the left. A cross section of the lens 102 is shown as having a step shape at the top end 950 (which matches the step shape 920 of the top part 910 of the eye wire 110) and having a step shape at the bottom end 952 (which matches the step shape 920 of the bottom part 912 of the eye wire 110).

Figure 10:
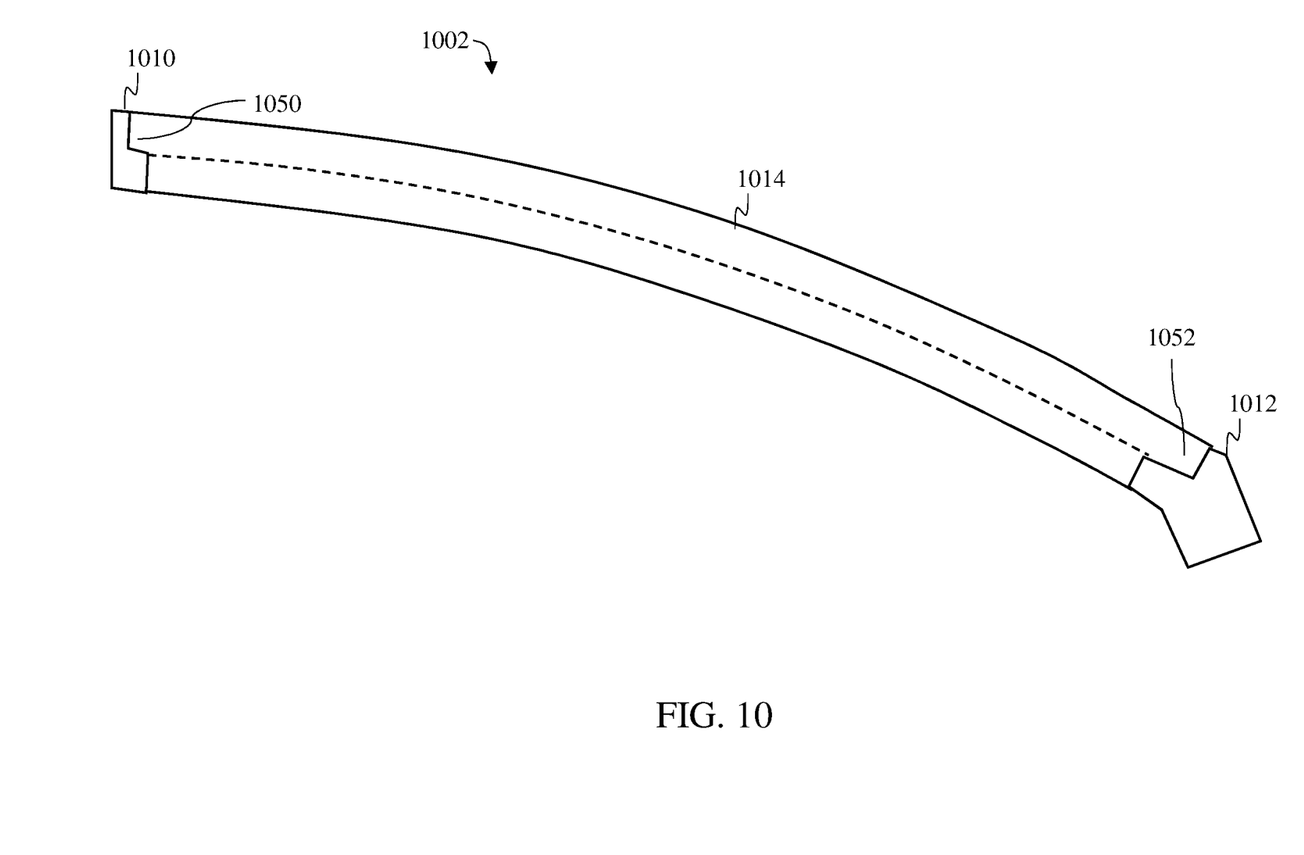
FIG. 10 depicts a cross sectional view of an eye wire and lens of the one-piece, composite eyewear article, according to an example embodiment

FIG. 10 depicts a cross sectional view 1002 of right eye wire 110 and lens 102 of the one-piece, composite eyewear article 100, according to an example embodiment. FIG. 10 shows that the cross section 1002 of the eye wire 110 is shown as two approximate L-shaped elements 1010 and 1012, wherein 1010 is the interior or proximal part of eye wire 110 and 1012 is the exterior or distal part of eye wire 110. Cross section 1002 depicts an approximate step shaped element representing the interior surface of the eye wire 110 at the proximal and distal elements 1010 and 1012, into which the lens 102 is located. A cross section of the lens 102 is shown as having a step shape at the proximal end 1050 (which matches the step shape of the proximal part 1010 of the eye wire 110) and having a step shape at the distal end 1052 (which matches the step shape of the distal part 1012 of the eye wire 110).

Figure 11:
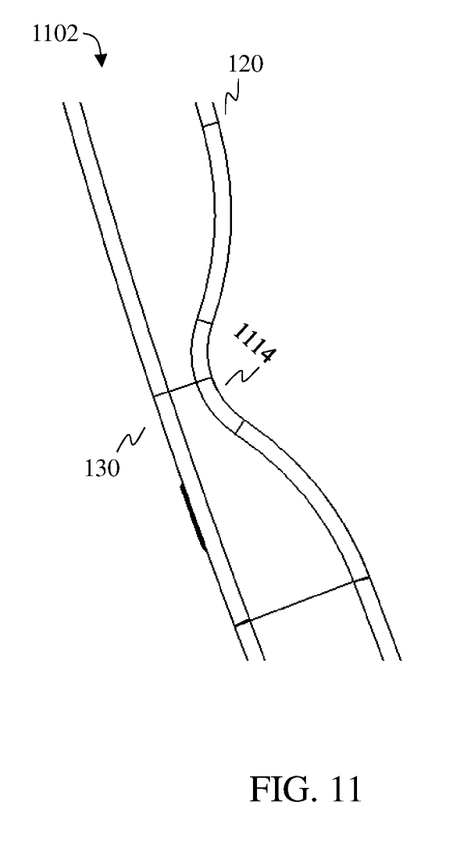
FIG. 11 depicts a top view of a hinge of the one-piece, composite eyewear article, according to an example embodiment.

FIG. 11 depicts a close-up 1102 of a top view taken of the right hinge 130 of the one-piece, composite eyewear article 100, according to an example embodiment. FIG. 11 shows that the right temple 120 has a uniform thickness that, as it approaches hinge 130, includes a détente or depression 114, which acts as a pivot point about which the temple 120 rotates.

The frame 101 and the lens 102 may be molded via a two-material molding process, such that the frame and the lens auto-adhere to each other during curing. Two material or multi-material injection molding is the process of molding two or more different materials into one part (or in one injection mold) at one time. As is the case in traditional injection molding, multi material injection molding uses materials that are at or near their melting point so that the semi-liquidous (viscous) material can fill voids and cavities within a pre-machined mold, thus taking on the desired shape of designed tooling. In general, advantages of multi-material injection molding over other production techniques include, but are not limited to, creating parts that have an elastic modulus that varies with location on the part (different regional polymer hardness), creating a single-structure part with different regional materials (similar to the previous advantage, but more focused on joining different types of polymers like rubber and plastic), and also creating a single part with multiple independent polymer colors. Injection molding of liquid silicone rubber is a process to produce pliable, durable parts.

Alternative to the two-material molding process, an insert over molding process may be used. Insert molding involves molding material around a core or "insert". The insert in this case may be the frame, around which the lenses are molded. Insert molding is often used to join the insert and secondary material together more securely than assembly allows. Moreover, it often eliminates post-molding assembly and saves the additional cost incurred in a secondary operation.

Injection molding consists of high pressure injection of raw material into a mold which shapes the polymer into the desired shape. Molds can be of a single cavity or multiple cavities. In multiple cavity molds, each cavity can be identical and form the same parts or can be unique and form multiple different geometries during a single cycle. For thermosets, two different chemical components may injected into the mold. These components immediately begin irreversible chemical reactions which eventually crosslinks the material into a single connected network of molecules. After the part has solidified, valves close to isolate the injection system and chemical precursors, and the mold opens to eject the molded part(s). Then, the mold closes and the process repeats.

In one embodiment, any of the components of the one-piece, composite eyewear article described above may comprise other materials, such as any thermoset elastomer, any plastic, polyethylene, PVC, or the like. In another embodiment, the frame 101 and/or lens 102 is tinted with any one of: carbon nano tint, soluble organic dye, metallic oxide pigments or any dye known in the art for use with thermoset elastomers. A thermoset is a material that is irreversibly cured from a soft solid or viscous liquid prepolymer or resin. The process of curing changes the resin into an infusible, insoluble polymer network, and is induced by the action of heat or suitable radiation often under high pressure, or by mixing with a catalyst. Thermoset resins are usually malleable or liquid prior to curing, and are often designed to be molded into their final shape.

In one embodiment, the entire frame 101 is composed of a single integral piece of cured liquid silicone rubber consisting of a liquid dimethyl polysiloxane polymer thermoset. Similarly, in one embodiment, the entire lens 102 is composed of a single integral piece of optical grade cured liquid silicone rubber consisting of a liquid dimethyl polysiloxane polymer thermoset. The term "single, integral piece" refers to one piece or part that is formed of a continuous volume of a polymer material that is injected all at once, and that cures all at once. For example, the lens 102 may be a single, integral piece of optical grade cured liquid silicone rubber that is injected into a mold all at once, and that cures all at once. In yet another embodiment, in lieu of a single lens 102, the article 100 may comprise two separate lenses, each lens located in one of the eye wires 110, 112.

The one-piece, composite eyewear article 100 may be prepared by a two-material molding process comprising the steps of providing a mold having: 1) a first void defining an eyewear frame 101 comprising of two temples 120, 122, two eye wires 110, 112, a bridge 150 and two hinges 130, 132, and 2) a second void defining a lens 102 situated within the two eye wires and extending across the bridge. The process continues by injecting the first void in the mold with liquid silicone rubber consisting of a liquid dimethyl polysiloxane polymer thermoset, so as to produce said frame as a single integral piece and injecting the second void in the mold with optical grade liquid silicone rubber consisting of a liquid dimethyl polysiloxane polymer thermoset, so as to produce said lens as a single integral piece. The process continues by allowing a predefined period of time to pass, wherein during said period of time, the frame auto-adheres to the lens during curing; and removing the one-piece, composite eyewear article from the mold.

The term "auto-adhere" refers to the process by which a first material in a liquid or semi-liquid state cures or cools down into a solid or near solid state while contacting a second material, wherein the first material adheres to, or forms a bond with, the second material. The second material may also be in a liquid or semi-liquid state, and the second material may cure or cool down into a solid or near solid state while contacting the first material.

Liquid dimethyl polysiloxane polymer thermoset belongs to a group of polymeric organosilicon compounds that are commonly referred to as silicones. It is the most widely used silicon-based organic polymer, and is particularly known for its unusual rheological (or flow) properties. It is optically clear, and, in general, inert, non-toxic, and non-flammable.

Embodiments may be described above with reference to functions or acts, which comprise methods. The functions/acts noted above may occur out of the order as shown or described. For example, two functions/acts shown or described in succession may in fact be executed substantially concurrently or the functions/acts may sometimes be executed in the reverse order, depending upon the functionality/acts involved. While certain embodiments have been described, other embodiments may exist. Further, the disclosed methods' functions/acts may be modified in any manner, including by reordering functions/acts and/or inserting or deleting functions/acts, without departing from the spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A one-piece, composite eyewear article, the article comprising:
    a) an eyewear frame comprising of two temples, two eye wires, a bridge and two hinges, the entire frame composed of a single integral piece of cured liquid silicone rubber consisting of a liquid dimethyl polysiloxane polymer thermoset;
    b) a lens situated within the two eye wires and extending across the bridge, the lens composed of a single integral piece of optical grade cured liquid silicone rubber consisting of a liquid dimethyl polysiloxane polymer thermoset; and
    c) wherein the frame and lens are molded via a two-material molding process, such that the frame auto-adheres to the lens during curing.

2. The one-piece, composite eyewear article of claim 1, wherein a first temple of the two temples is coupled with the first eye wire of the two eye wires via a first hinge of the two hinges, a second temple of the two temples is coupled with a second eye wire of the two eye wires via a second hinge of the two hinges, and the first eye wire is coupled with the second eye wire via the bridge.

3. The one-piece, composite eyewear article of claim 2, wherein an interior circumference of the first and second eye wires comprises a step shape.

4. The one-piece, composite eyewear article of claim 3, wherein a first portion of the lens is situated within, and contacts, the entire step shape of the interior circumference of the first and second eye wires.

5. The one-piece, composite eyewear article of claim 4, wherein the first portion of the lens auto-adheres to the entire step shape of the interior circumference of the first and second eye wires.

6. The one-piece, composite eyewear article of claim 5, wherein the bridge comprises a forward-facing groove extending from the first eye wire to the second eye wire.

7. The one-piece, composite eyewear article of claim 6, wherein a second portion of the lens is situated within, and contacts, the groove of the bridge.

8. The one-piece, composite eyewear article of claim 7, wherein the second portion of the lens auto-adheres to the groove of the bridge.

9. The one-piece, composite eyewear article of claim 8, wherein the first hinge comprises a first détente in the first temple and the second hinge comprises a second détente in the second temple.

10. The one-piece, composite eyewear article of claim 9, wherein the first détente is configured to allow the first temple to rotate about the first hinge, and wherein the second détente is configured to allow the second temple to rotate about the second hinge.

11. The one-piece, composite eyewear article of claim 10, wherein the frame is tinted with any one of: carbon nano tint, soluble organic dye and metallic oxide pigments.

12. The one-piece, composite eyewear article of claim 11, wherein the lens is tinted with any one of: carbon nano tint, soluble organic dye and metallic oxide pigments.

13. A one-piece, composite eyewear article, the article comprising:
    a) an eyewear frame comprising of two temples, two eye wires, a bridge and two hinges, the entire frame composed of a single integral piece of cured liquid silicone rubber consisting of a liquid dimethyl polysiloxane polymer thermoset;
    b) two lenses, each lens situated within one of the two eye wires and each lens composed of optical grade cured liquid silicone rubber consisting of a liquid dimethyl polysiloxane polymer thermoset; and
    c) wherein the frame and lens are molded via a two-material molding process, such that the frame auto-adheres to the lens during curing.

14. The one-piece, composite eyewear article of claim 13, wherein a first temple of the two temples is coupled with the first eye wire of the two eye wires via a first hinge of the two hinges, a second temple of the two temples is coupled with a second eye wire of the two eye wires via a second hinge of the two hinges, and the first eye wire is coupled with the second eye wire via the bridge.

15. The one-piece, composite eyewear article of claim 14, wherein the first hinge comprises a first détente in the first temple and the second hinge comprises a second détente in the second temple.

16. The one-piece, composite eyewear article of claim 15, wherein the first détente is configured to allow the first temple to rotate about the first hinge, and wherein the second détente is configured to allow the second temple to rotate about the second hinge.

17. The one-piece, composite eyewear article of claim 16, wherein the frame is tinted with any one of: carbon nano tint, soluble organic dye and metallic oxide pigments.

18. The one-piece, composite eyewear article of claim 17, wherein the two lenses are tinted with any one of: carbon nano tint, soluble organic dye and metallic oxide pigments.

19. A one-piece, composite eyewear article, the article prepared by a process comprising the steps of:

a) providing a mold having a first void defining an eyewear frame comprising of two temples, two eye wires, a bridge and two hinges, and a second void defining a lens situated within the two eye wires and extending across the bridge;
b) injecting the first void in the mold with liquid silicone rubber consisting of a liquid dimethyl polysiloxane polymer thermoset, so as to produce said frame as a single integral piece;
c) injecting the second void in the mold with optical grade liquid silicone rubber consisting of a liquid dimethyl polysiloxane polymer thermoset, so as to produce said lens as a single integral piece;
d) allowing a predefined period of time to pass, wherein during said period of time, the frame auto-adheres to the lens during curing; and
e) removing the one-piece, composite eyewear article from the mold.

* * * * *